(12) United States Patent  
Curtis

(10) Patent No.: US 9,004,539 B2  
(45) Date of Patent: Apr. 14, 2015

(54) TIRE SPRAY COLLECTING ASSEMBLY FOR TRUCKS AND TRAILERS

(71) Applicant: James Samuel Curtis, Abbotsford (CA)

(72) Inventor: James Samuel Curtis, Abbotsford (CA)

( * ) Notice: Subject to any disclaimer, the term of this patent is extended or adjusted under 35 U.S.C. 154(b) by 0 days.

(21) Appl. No.: 14/252,367

(22) Filed: Apr. 14, 2014

(65) Prior Publication Data

US 2014/0225360 A1    Aug. 14, 2014

Related U.S. Application Data

(63) Continuation of application No. 13/531,327, filed on Jun. 22, 2012, now Pat. No. 8,696,029.

(60) Provisional application No. 61/500,861, filed on Jun. 24, 2011, provisional application No. 61/511,205, filed on Jul. 25, 2011.

(51) Int. Cl.
*B62D 25/16* (2006.01)
*B62D 25/18* (2006.01)

(52) U.S. Cl.
CPC .............. *B62D 25/18* (2013.01); *B62D 25/168* (2013.01); *B62D 25/182* (2013.01)

(58) Field of Classification Search
USPC ........ 280/847, 152.1, 152.2, 152.3, 848, 849, 280/850, 851, 852, 853
See application file for complete search history.

(56) References Cited

U.S. PATENT DOCUMENTS

| 3,834,732 | A | 9/1974 | Schons |
| 4,071,273 | A | 1/1978 | Hack et al. |
| 4,290,619 | A | 9/1981 | Goodall |
| 5,199,742 | A | 4/1993 | Götz et al. |
| 5,299,831 | A | 4/1994 | Schmidt |
| 5,961,148 | A | 10/1999 | Cheng |
| 7,316,420 | B2 * | 1/2008 | Loddo ........................ 280/851 |
| 8,276,971 | B2 * | 10/2012 | Hirano ....................... 296/180.1 |
| 8,479,852 | B2 * | 7/2013 | Maurer et al. ............... 180/68.2 |

FOREIGN PATENT DOCUMENTS

| DE | 3939937 | 2/1991 |
| EP | 2058141 | 5/2009 |
| GB | 2004823 | 4/1979 |

OTHER PUBLICATIONS

English Abstract of DE3939937.

* cited by examiner

*Primary Examiner* — John Walters
(74) *Attorney, Agent, or Firm* — Cameron IP

(57) ABSTRACT

The present invention relates to a tire spray collecting assembly for a vehicle, such as a truck and/or trailer. There is accordingly provided a tire spray collecting assembly connectable to a fender of a vehicle. The assembly includes an air diverter connectable to the rear end of the fender for directing tire water spray towards the front end of the vehicle. The assembly includes a collector connectable to the bottom of the fender. The collector is configured to capture said water spray so re-directed.

19 Claims, 12 Drawing Sheets

TIRE SPRAY COLLECTING ASSEMBLY FOR TRUCKS AND TRAILERS

CROSS REFERENCE TO RELATED APPLICATION

This application is a continuation of application Ser. No. 13/531,327 filed in the United States Patent and Trademark Office on Jun. 22, 2012, the disclosure of which is incorporated herein by reference and priority to which is claimed, which in turn claims the benefit of provisional application No. 61/500,861 filed in the United States Patent and Trademark Office on Jun. 24, 2011, the disclosure of which is incorporated herein by reference and priority to which is claimed and which in turn also claims the benefit of provisional application No. 61/511,205 filed in the United States Patent and Trademark Office on Jul. 25, 2011, the disclosure of which is incorporated herein by reference and priority to which is claimed.

FIELD OF THE INVENTION

The present invention relates to a tire spray collecting assembly. In particular, the invention relates to a tire spray collecting assembly for trucks and trailers.

DESCRIPTION OF THE RELATED ART

Water spray arising from tires is a persistent problem for truck drivers and also other vehicles on the road. Once the wheel reaches a certain speed, a steady stream of water may deflect off the tire because of centrifugal forces relating to the rotation of the wheel. With the increased horsepower of today's trucks, trucks are able to travel at high speeds along longer stretches of road and this issue is thus becoming more and more acute. Water may hit the back of the truck's cab and thereby inhibit the truck driver's rear window visibility.

While many trucks have mudflaps, water spray may still exit outwards from the truck in a sideways direction, thereby hindering the driver's peripheral visibility. This is particularly true when there are cross-winds. Vehicles aligned with the trucks in parallel lanes can get hit by this spray, also thereby affecting visibility of their drivers. The water spray can interact with the headlights of adjacent vehicles and affect the visibility of the truck driver and also the visibility of drivers of the adjacent vehicles. These are particularly acute problems at night when visibility is already reduced. Unfortunately, little known progress has been made to address these serious issues.

A more efficient mud guard and fender type system may now be needed more than ever, considering that most transport units are going to a three axle wheel configuration on class 7 and 8 tractors and trailers. The three axle units are further increasing the amount of water being thrown out at passing vehicles.

In view of the above, agencies such as the American Transport Safety Board may be interested in a system to improve said aforementioned dangerous situations, and there is accordingly a need for an improved and more efficient means of reducing and collecting tire spray which addresses the above issues.

BRIEF SUMMARY OF INVENTION

The present invention provides a tire spray collecting assembly disclosed herein that overcomes the above disadvantages. It is an object of the present invention to provide an improved tire spray collecting assembly.

There is accordingly provided a tire spray collecting assembly connectable to a fender of a vehicle. The assembly includes an air diverter connectable to the rear end of the fender for directing tire water spray towards the front end of the vehicle. The assembly includes a collector connectable to the bottom of the fender. The collector is configured to capture said water spray so re-directed.

According to another aspect, there is provided a kit. The kit includes an air diverter connectable to the rear end of a wheel fender. The kit includes a collector for receiving tire spray directed thereto by the diverter. The collector is connectable to the bottom of the fender.

According to a further aspect, there is provided a wheel spray collecting assembly. The assembly includes a u-shaped air diverter connectable to a rear end of a fender. The assembly includes a collector connectable to the bottom of the fender for collecting water spray directed thereto by the diverter.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
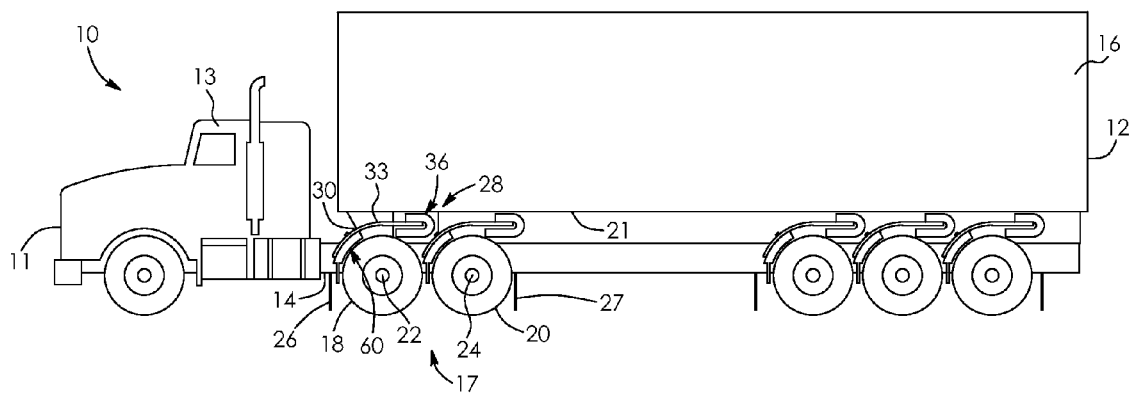
FIG. 1 is a side elevation view of a truck and tire spray collecting assemblies therefor, according to a first embodiment.
Figure 2:
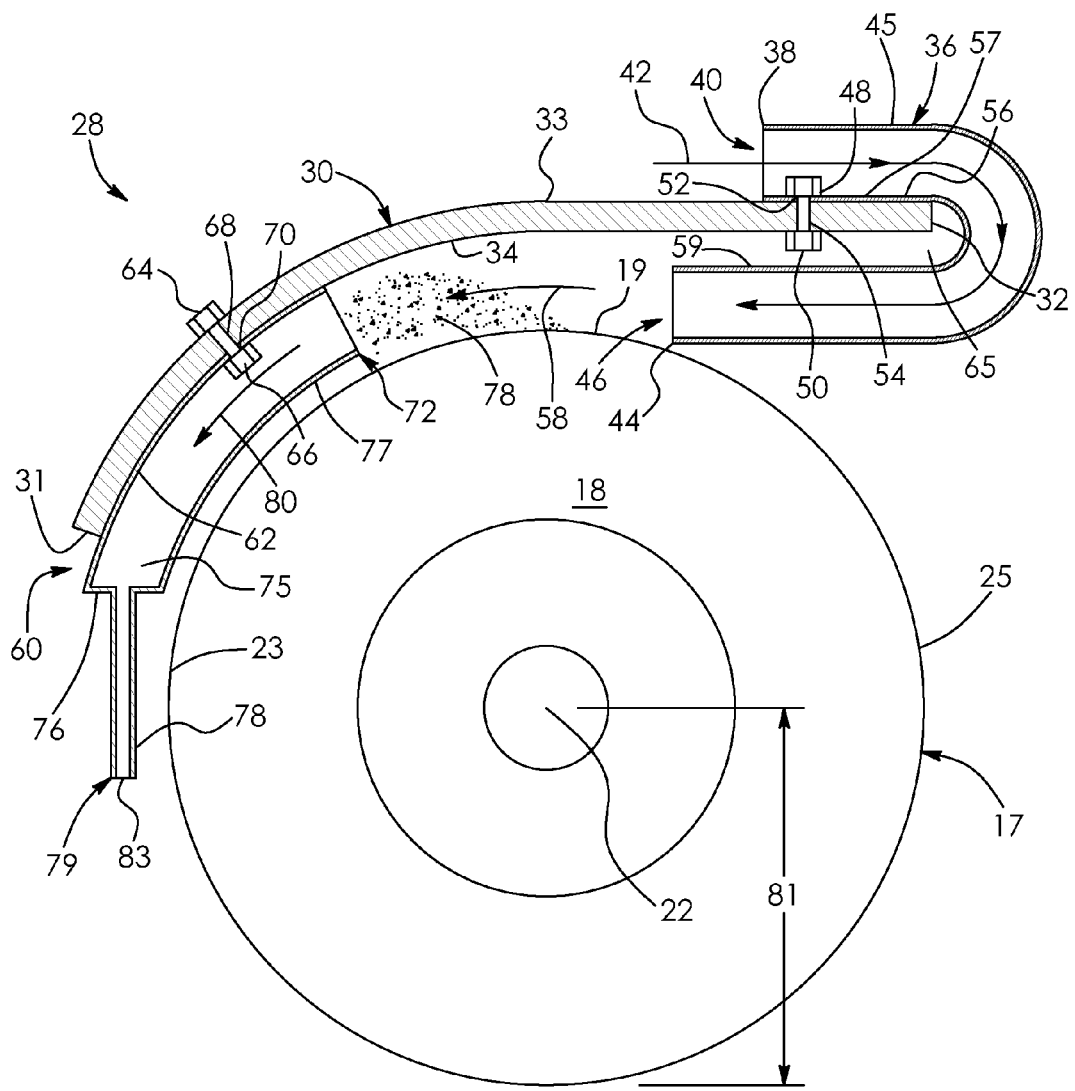
FIG. 2 is a cross-sectional, side elevation view of one of the tire spray collecting assemblies shown in FIG. 1 with a tire and a fender of the truck shown in FIG. 1 also being shown, the assembly including a diverter and a collector.

Referring to the drawings and first to FIG. 1, there is shown a vehicle, in this example a truck 10. The truck has a front end 11, a rear end 12 opposite the front end, a front cab 13 located at the front end, a frame 14 connected to and extending rearwards from the cab, a truck trailer 16 mounted onto the frame, and a plurality of wheels 17, each rotatably connected to the frame via axles, such as axles 22 and 24. The wheels each have ground-engaging tires such as tires 18 and 20 shown in FIG. 1. As shown in FIG. 2, tire 18 has a top position 19, a front position 23 and a back position 25 opposite the front position.

Referring back to FIG. 1, the truck 10 includes a plurality of mudflaps as shown by mudflaps 26 and 27, in this example extending downwards from the frame 14, from the perspective of FIG. 1. The mudflaps are selectively interposed between the wheels of the truck.

Truck 10 includes arcuate cover members, in this example truck fenders 30, one for each of its tires 18 and 20. Each fender 30 is mounted to and is operatively connected to the frame of the truck in a conventional, known manner. Referring to FIG. 2, fender 30 is shaped to partially cover the top position 19 of tire 18 and is configured to impede the propagation of water spray discharged from the tire. Each fender 30 may be a conventional, off-the-shelf component such as a single axle MIN950 model fender sold by Spray Control Systems, Inc. Each fender has a front end 31 facing the front end of the truck and is curved so as to partially follow the contour of the tire 18. Fender 30 also has a rear end 32 opposite the front end, the rear end 32 facing the rear end of the truck. The fender also has a top 33 facing bottom 21 of trailer 16, as shown in FIG. 1, and a bottom 34 opposite the top and which faces one of the tires 18.

Referring to FIG. 1, the truck has a plurality of tire spray collecting assemblies 28 for each of its wheels and of which only one assembly 28 will be discussed, with the understanding that the other assemblies are substantially the same.

Figure 3:
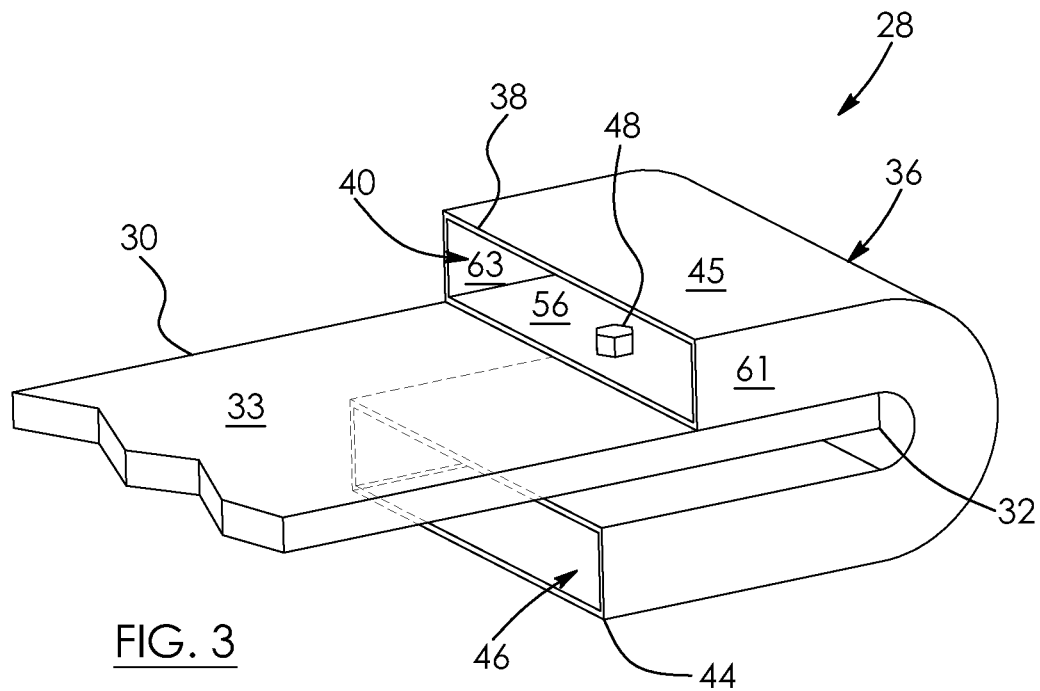
FIG. 3 is a perspective view of the diverter and the fender shown in FIG. 2, with the fender being shown in fragment.

Referring to FIG. 2, assembly 28 has an air diverter 36. The diverter is a duct that is rectangular in cross-section in this example as best seen in FIG. 3. Diverter 36 has an elongate, u-shape as shown in FIGS. 2 and 3. Diverter 36 is configured to extend around, or about, rear end 32 of the fender 30. The diverter has a first end 38 disposed adjacent to top 33 and end 32 of the fender and an inlet 40 at its first end 38. The inlet is rectangular in cross-section in this example, as shown in FIG. 3, and faces the front end 11 of the truck 10 seen in FIG. 1. Referring back to FIG. 2, inlet 40 is configured to capture moving air, as illustrated by arrow 42, caused by the forward motion of the truck.

Diverter 36 has a second end 44 adjacent to bottom 34 of fender 30 and an outlet 46 at its second end 44. As shown in FIG. 3, the outlet is also rectangular in cross-section in this example, and also faces the front end 11 of the truck 10 seen in FIG. 1.

As seen in FIG. 3, diverter 36 has a u-shaped outer wall 45 that extends from end 38 to end 44 of the diverter. The diverter also has a u-shaped inner wall 56 in this example. The inner wall is opposite wall 45 and also extends from end 38 to end 44 of the diverter. As seen in FIG. 2, wall 56 has a first portion 57 configured to abut top 33 of fender 30 and a second portion 59 disposed adjacent to bottom 34 of the fender. End 32 of the fender 30 extends between portions 57 and 59 of wall 56 and thus into the u-shaped cavity 65 formed by wall 56. As shown in FIG. 3, diverter 36 also includes a pair of u-shaped spaced-apart sides 61 and 63 that connect together and extend between outer wall 45 and inner wall 56.

Referring back to FIG. 2, diverter 36 connects to the fender 30 via a first connector, in this example in the form of a bolt 48 and nut 50. Bolt 48 extends through an aperture 52 in the first portion 57 of the inner wall 56 of the diverter 36. Aperture 52 in this example is located by the diverter's end 38. The bolt also extends through an aperture 54 of the fender located adjacent to and spaced-apart from the fender's rear end 32. Bolt 48 is threadably engageable with nut 50, which abuts bottom 34 of fender 30.

Figure 4:
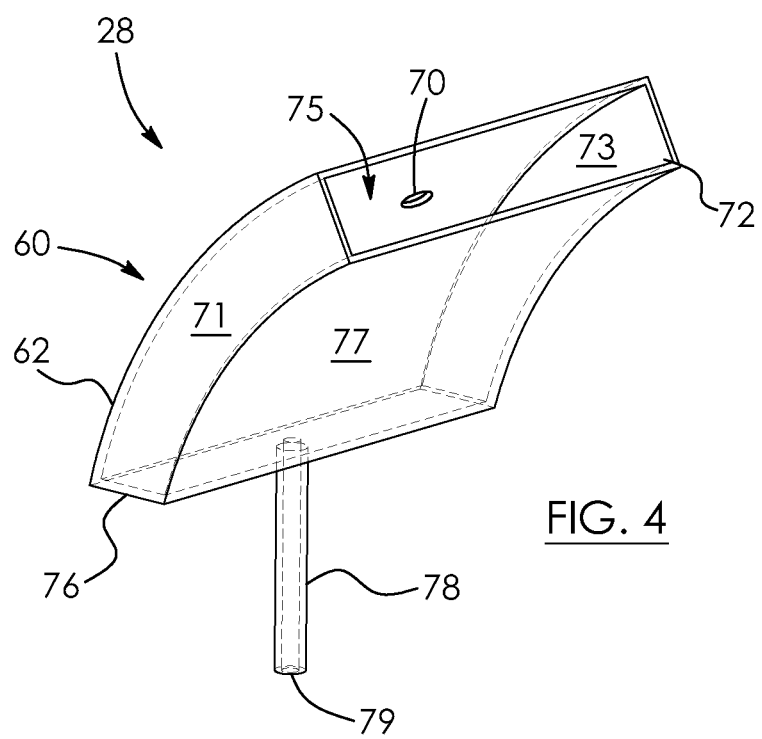
FIG. 4 is a perspective view of the collector shown in FIG. 2.

The tire spray collecting assembly 28 has a collector 60 for collecting water spray. The collector has an arcuate shape and forms a duct that is rectangular in cross-section in this example as shown in FIG. 4. Collector 60 is disposed adjacent to the front end 31 of fender 30 and is interposed between the bottom 34 of fender 30 and the tire 18. The collector has a convexly curved outer wall 62 disposed adjacent to bottom 34 of fender 30. Collector 60 is connected to the fender via a second connector, in this example in the form of a bolt 64 and nut 66. Bolt 64 abuts top 33 of the fender, extends through aperture 68 of fender 30 located adjacent to end 31 in this example and extends through aperture 70 in wall 62 of the collector. The bolt is threadably engageable with the nut 66, which is disposed within collector 60.

Collector 60 has an open end or inlet 72 which is adjacent to and spaced-apart from near the top position 19 of the tire 18. Inlet 72 also at least partially faces outlet 46 of the diverter 36. Inlet 72 is thus configured and positioned to capture water spray 58 arising, or discharged, from the tire 18. It is also thereby configured and positioned to capture re-directed air exiting from outlet 46 of the diverter. The collector has an interior 75 and a base 76 opposite and spaced-apart from the inlet 72. Collector 60 has a concavely curved inner wall 77 that faces the tire 18 and which is, advantageously, configured to act as an arcuate-shaped additional mudguard for capturing and deflecting downwards water spray that contacts the wall. As shown in FIG. 4, the collector has a pair of spaced-apart sides 71 and 73 that extend from its inlet 72 to base 76. The sides connect together and extend between inner wall 77 and outer wall 62. Collector 60 has an outlet in this example in the form of an outlet conduit 78 which is in communication with interior 75. The conduit in this example is a tube which extends from base 76 downwards in a generally vertical direction, from the perspective of FIGS. 2 and 4, such that the conduit's distal end 79, which is spaced-apart from base 76, aligns with axle 22 in this example, though this is not strictly required. In other embodiments, for example, end 79 may be disposed downwards relative to axle 22 such that it is located adjacent to and aligns with at a point along the bottom half position 81 of the wheel 17. The collector 60 has an outlet 83 located at end 79 and through which water may exit from the conduit 78.

In operation, tire spray originating from the tire 18 moves radially outwards from the tire at a speed faster than the motion of the truck due to the wheel's centrifugal force. This causes the tire spray to move in a turbulent manner. Referring to FIG. 2, air passing over fender 30 as indicated by arrow 42 is captured by the diverter 36 via inlet 40 and diverted to the space between the tire 18 and bottom 34 of the fender, as indicated by arrow 58, thereby causing the air to change direction, by 180 degrees in this example. The diverted air as indicated by arrow 58 promotes the slowing down and diversion of water spray 78, which would otherwise move upwards and radially outwards from the tire 18 due to centrifugal force, towards inlet 72 of the collector 60. Put another way, the diverted air, whose speed is related to the speed with which the truck is driven, slows down the motion of the water spray, acting to reduce the turbulent nature of the spray. Water so captured by the collector 60 is directed downwards via gravity through the collector towards its base 76, as indicated by the arrow of numeral 80, and then passes through outlet conduit 78 to the roadway. Also, water spray discharged from the tire 18 below inlet 72 is deflected downwards by wall 77. Thus, assembly 30 as herein described captures and disposes of water spray in a relatively controlled manner. The invention as herein described uses air flow arising from the motion of the truck to control said water coming off the tires and directs it into what may be referred to as a water guidance system, which returns the water to the roadway.

Figure 5:
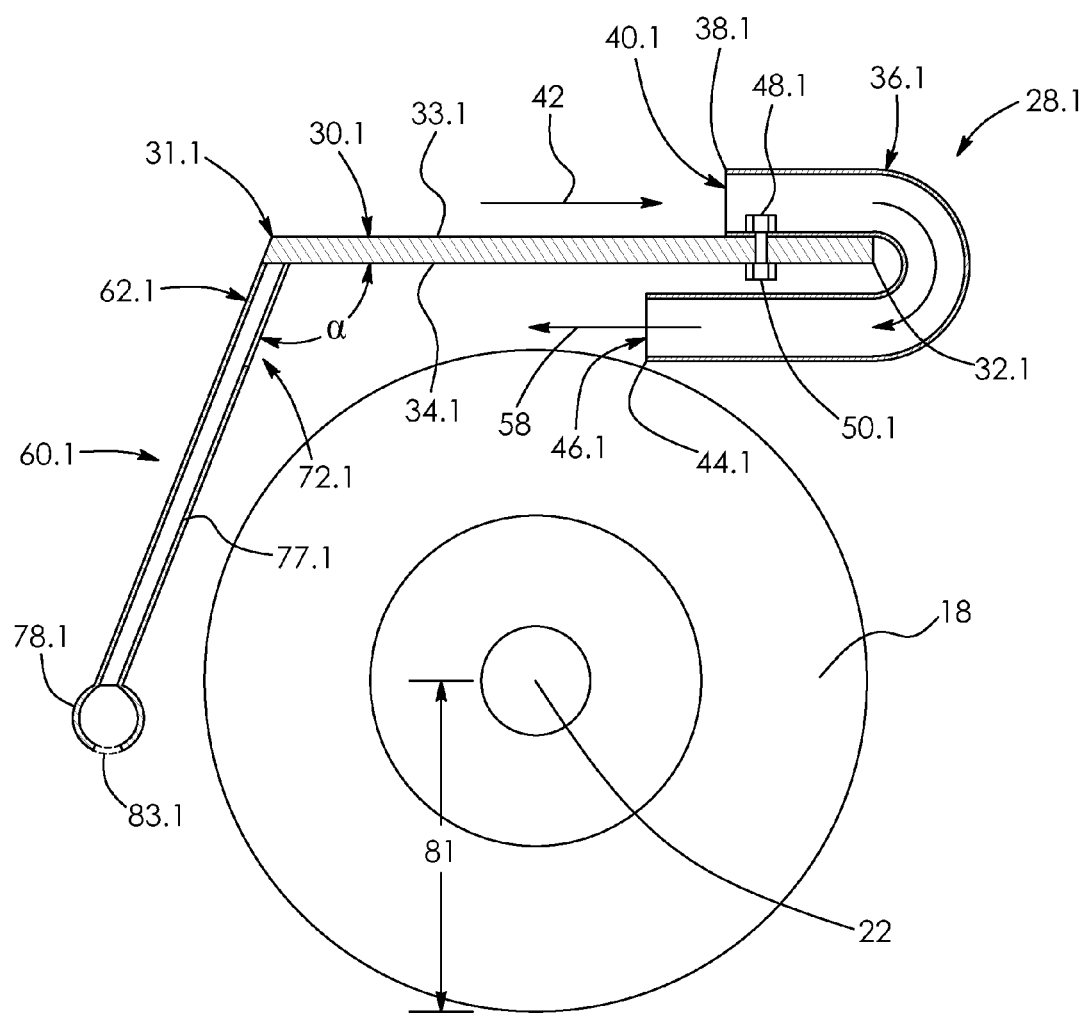
FIG. 5 is a cross-sectional, side elevation view of a tire spray collecting assembly according to a second embodiment, together with a fender and a truck tire.

FIG. 5 shows a tire spray collecting assembly 28.1 according to a second embodiment Like parts have like numbers and function as the embodiment shown in FIGS. 1 to 4 with the addition of decimal extension ".1". Tire spray collecting assembly 28.1 is substantially the same as the tire spray collecting assembly 28 shown in FIGS. 1 to 4 with the following exceptions. Collector 60.1 is elongate and straight, in contrast to the curved shape of collector 60 shown in FIG. 5. Also, collector 60.1 is integral with and extends downwards from fender 30.1, from the perspective of FIG. 5. In particular, wall 62.1 of the collector is adjacent to and connects with end 31.1 of the fender. Collector 60.1 is angularly spaced-apart from the fender by angle α relative to bottom 34.1 of the fender. Angle α is equal to 110 degrees according to one preferred example, though this is not strictly required. Inner wall 77.1 of the collector has a flat, rectangular shape forming a mudguard in this embodiment. Inlet 72.1 extends through wall 77.1 and is disposed adjacent to end 31.1 of the fender 30.1. Outlet conduit 78.1 is round in section and extends in a direction coaxial with axle 22. The outlet conduit is disposed below axle 22 and is adjacent to and aligns with the bottom half position 81 of the tire 18. Assembly 28.1 operates in a similar manner as assembly 28.

Figure 6:
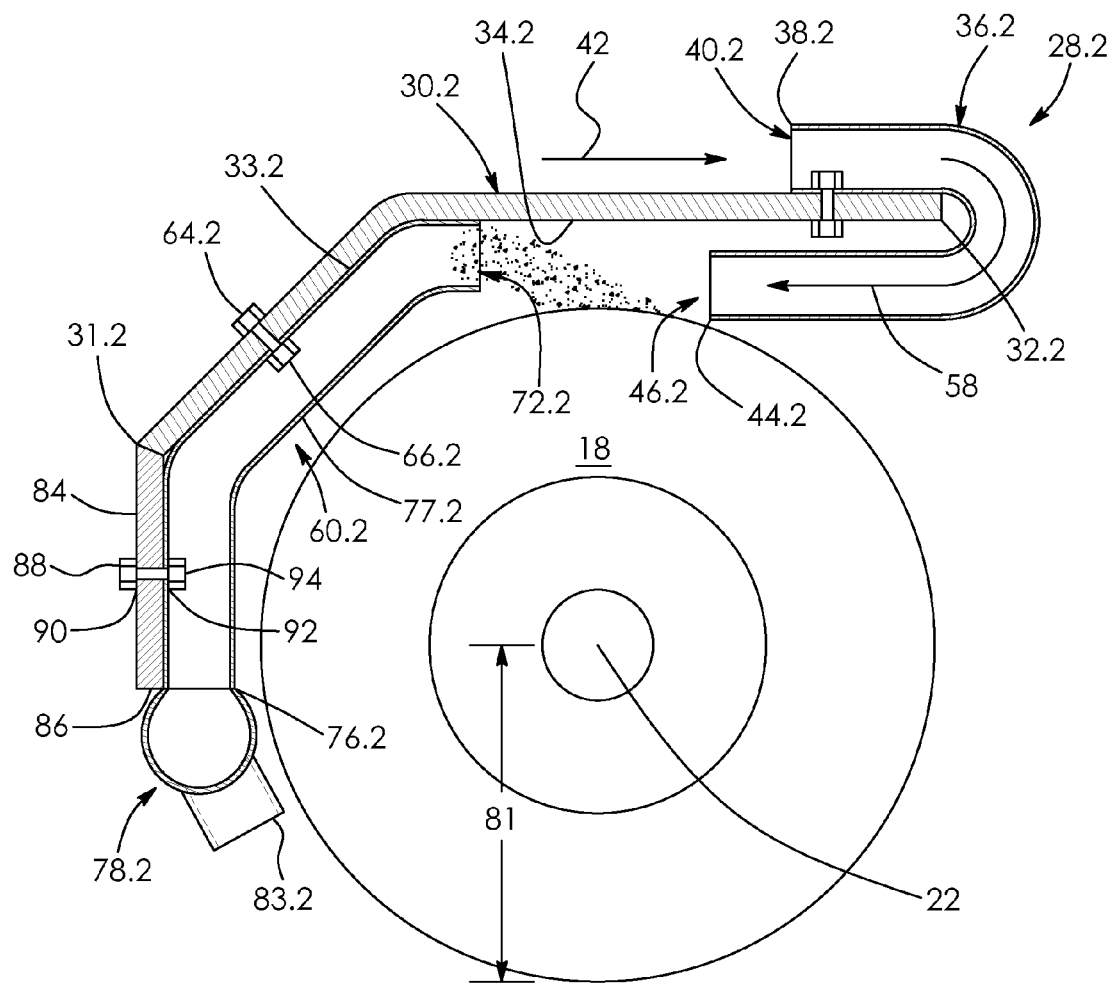
FIG. 6 is a cross-sectional, side elevation view of a tire spray collecting assembly according to a third embodiment together with a fender and a truck tire.

FIG. 6 shows a tire spray collecting assembly 28.2 according to a third embodiment Like parts have like numbers and function as the embodiment shown in FIGS. 1 to 4 with the addition of decimal extension ".2". Tire spray collecting assembly 28.2 is substantially the same as the tire spray collecting assembly 28 shown in FIGS. 1 to 4 with the following exceptions. Assembly 28.2 has an elongate member, in this example an auxiliary flap 84 connected to and extending downwards in a generally vertical direction from end 31.2 of the fender 30.2, from the perspective of FIG. 6. The auxiliary flap has a distal end 86 spaced-apart from end 31.2 of the fender. Collector 60.2 is shaped to extend adjacent to and cover a larger portion of the tire 18, relative to collector 60 shown in FIG. 2. The collector has an elongated v-shape in this example that faces tire 18. The collector's base 76.2 aligns adjacent to distal end 86 of the flap 84. The assembly 28.2 includes a further connector for further securing the collector to the flap, in this example in the form of bolt 88 extending through an aperture 90 of the flap 84 and an adjacent aperture 92 of the collector 60.2, and a nut 94 disposed within the collector and configured to threadably connect with the bolt 88.

Figure 7:
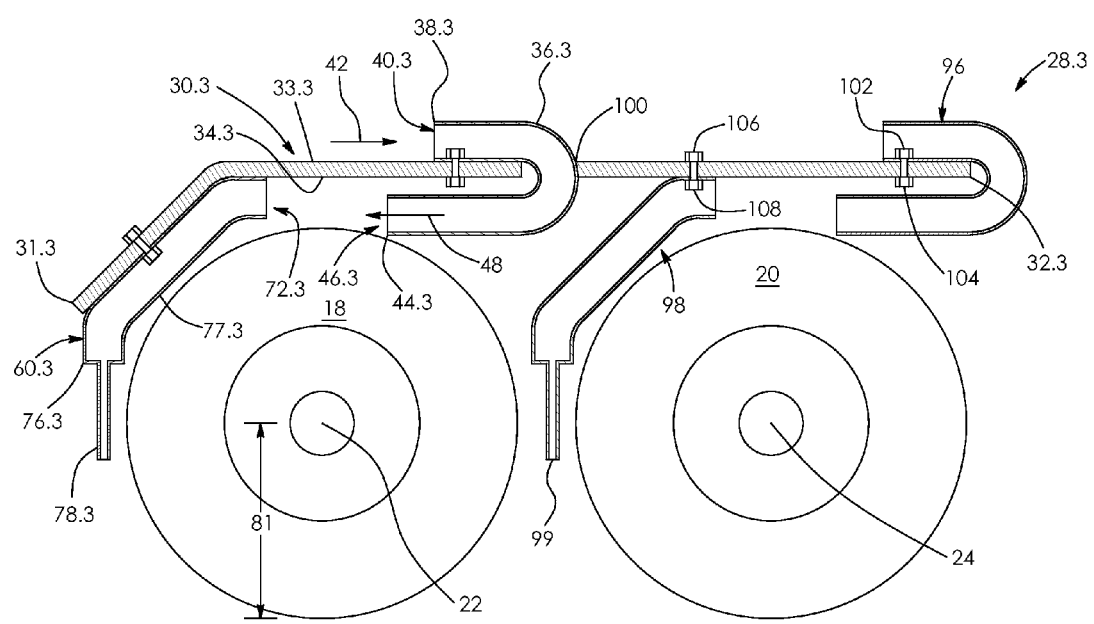
FIG. 7 is a cross-sectional, side elevation view of a tire spray collecting assembly according to a fourth embodiment together with a fender and a pair of truck tires.
Figure 8:
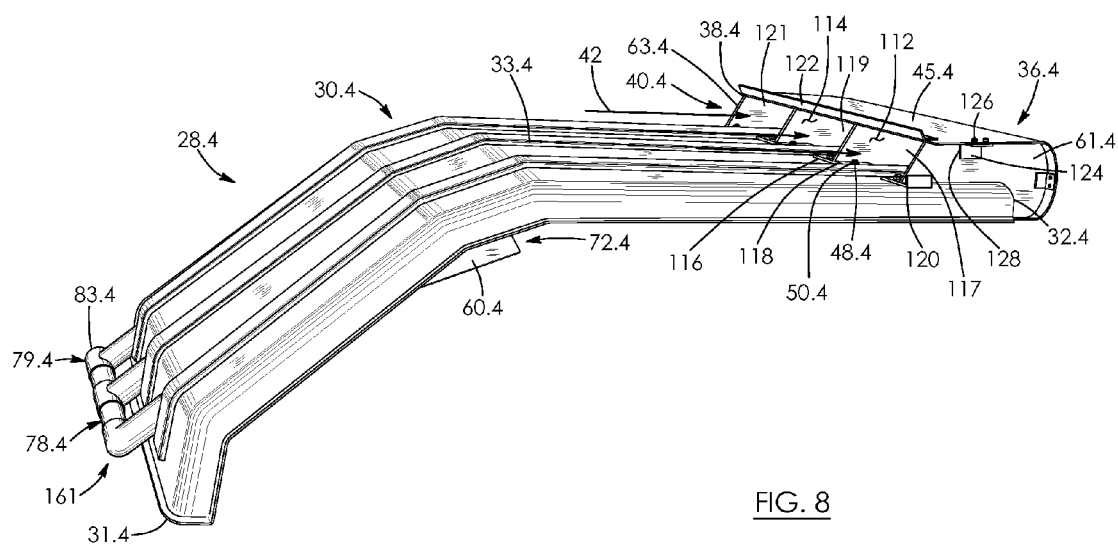
FIG. 8 is a top, front perspective view of a tire spray collecting assembly according to a fifth embodiment and a fender connecting the assembly together, the assembly having a diverter and a collector.

FIG. 7 shows a tire spray collecting assembly 28.3 according to a fourth embodiment adapted for a two-axle wheel configuration. Like parts have like numbers and function as the embodiment shown in FIGS. 1 to 4 with the addition of decimal extension ".3". Tire spray collecting assembly 28.3 is generally similar to the tire spray collecting assembly 28 shown in FIGS. 1 to 4 with one exception being that the truck's fender 30.3 is a tandem fender configured to extend across two tires 18 and 20 and their respectively axles 22 and 24. Assembly 28.3 includes a pair of diverters 36.3 and 96 and a pair of collectors 60.3 and 98. Diverters 36.3 and 96 are substantially the same and collectors 60.3 and 98 are substantially the same. The collectors generally have an elongated u-shape facing the tires. The fender is a conventional, off-the-shelf component, such as a MINTF900 model fender sold by Spray Control Systems, Inc., in this example. Fender 30.3 has been modified to include an aperture 100 interposed between tires 18 and 20 and ends 31.3 and 32.3 of the fender and through which diverter 36.3 is disposed. Diverter 96 is connected to the fender via bolt 102 and nut 104, and collector 98 is connected to the fender via bolt 106 and nut 108. Outlet conduit 99 of collector 98 is interposed between the tires 18 and 20. Diverter 36.3 and collector 60.3 are configured to collect water spray primarily arising from tire 18 and diverter 96 and collector 98 are configured to collect water spray arising from tire 20.

In a further variation, assembly 28.3 may omit collector 98 and/or diverter 36.3.

FIGS. 8 to 11 show a tire spray collecting assembly 28.4 according to a fifth embodiment Like parts have like numbers and function as the embodiment shown in FIGS. 1 to 4 with the addition of decimal extension ".4". Tire spray collecting assembly 28.4 is substantially the same as the tire spray collecting assembly 28 shown in FIGS. 1 to 4 with the following exceptions. Diverter 36.4 does not include an inner wall 56 shown in FIG. 2. Rather, the diverter connects to fender 30.4 via a plurality of internal dividers and flanges. Diverter 36.4 has a pair of internal dividers 112 and 114 spaced-apart along inlet 40.4 at set intervals relative to sides 61.4 and 63.4. The internal dividers are disposed adjacent to first end 38.4 of the diverter. The dividers 112 and 114 extend from outer wall 45.4 of the diverter to top 33.4 of the fender 30.4. The dividers extend to the right of end 38.4, from the perspective of FIG. 8, extend internally through the interior of the diverter and extend down past the top 33.4 of the fender 30.4. The dividers 112 and 114 are configured to inhibit air cross-flows and configured to promote the passage of air through the diverter 36.4 in an efficient manner. The dividers 112 and 114 also serve as braces which enhance the rigidity of the diverter. Each divider, as shown by divider 112, has a pair of flanges 116 and 118 extending tangentially therefrom. The flanges are configured to abut the top 33.4 of the fender 30.4. Nuts and bolts as shown by nut 50.4 and bolt 48.4 extend through the flanges and connect to the fender 30.4 in a manner as described before so as to connect the diverter 36.4 to the fender. Sides 61.4 and 63.4 of the diverter also have flanges connected thereto, as shown by flange 120 for side 61.4. Flanges 120 are also configured to abut with and connect to the fender 30.4 via nuts and bolts.

Inlet 40.4 of the diverter 36.4 has a plurality of sections in this example three sections 117, 119, and 121 interposed between side 61.4, divider 112, divider 114 and side 63.4, respectively, for receiving incoming air. The diverter has a deflector that is elongate, peripheral and in this example an angled plate 122, disposed at the first end 38.4 of the diverter. Plate 122 extends between sides 61.4 and 63.4 of the diverter. The angled plate extends outwards and upwards from and relative to outer wall 45.4. Plate 112 is configured to deflect air otherwise passing over the diverter 36.4 downwards and into inlet 40.4.

Sides 61.4 and 63.4, as shown by side 61.4, connect to the outer wall 45.4 via a plurality of brackets as shown by bracket 124, connectors, in this example, screws 126 and welding 128, in a known and conventional manner.

Figure 9:
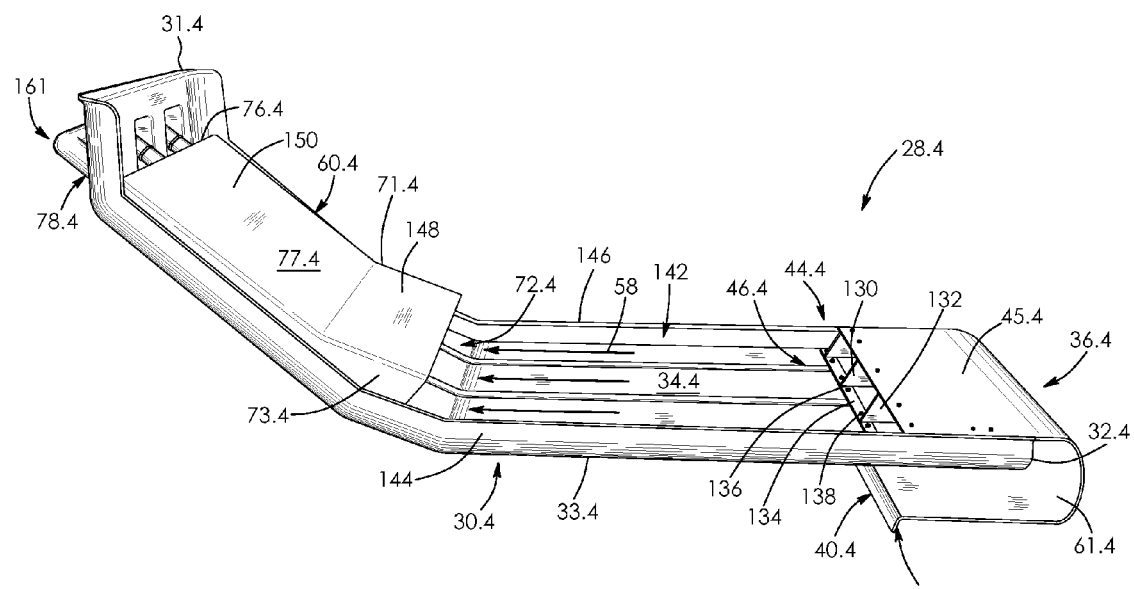
FIG. 9 is a bottom perspective view of the assembly and the fender shown in FIG. 8.

Referring to FIG. 9, the diverter 36.4 has a pair of internal dividers 130 and 132 spaced-apart along outlet 46.4 and disposed adjacent to second end 44.4 of the diverter. The dividers extend from outer wall 45.4 of the diverter to bottom 34.4 of the fender 30.4. Divides 130 and 132 are spaced-apart from sides 61.4 and 63.4 at set intervals and generally align with dividers 112 and 114 shown in FIG. 8. An elongate flange 134 abuts bottom 34.4 of the fender and also connects to the ends of the dividers and sides of the diverter via welding 136. Nuts and bolts as generally indicated by numeral 138 extend through the flange and connect to the fender in a manner as described before so as to further connect diverter 36.4 to the fender.

The fender 30.4 has a pair of spaced-apart sides 144 and 146. Bottom 34.4 extends between sides 144 and 146. The fender 30.4 has a partially enclosed passageway 142 formed by spaced-apart sides 144 and 146 and bottom 34.4 and through which air 58 passes. Fender 30.4 in this example is an off-the-shelf Fenderette (trademark) type fender made of plastic and carbon fibre. The fender may have the ability to twist and snap back into place. The fender 30.4 may be configured to be spaced-apart from the tire by two to three inches in one example.

Figure 10:
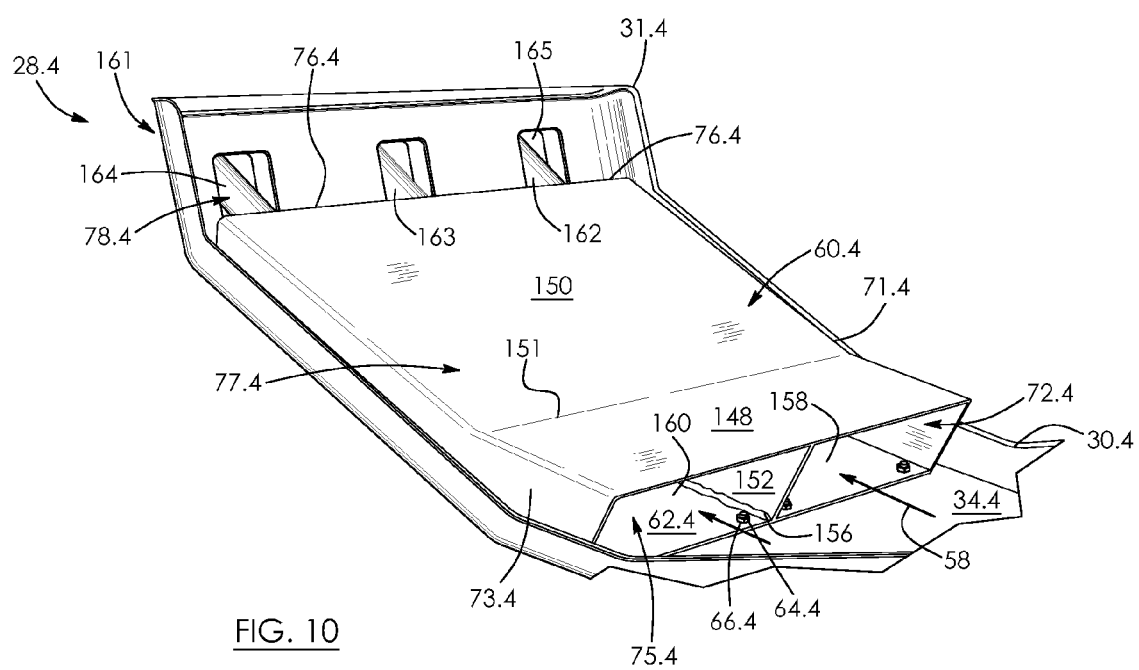
FIG. 10 is a bottom perspective view of the collector shown in FIG. 8 and part of the fender shown in FIG. 8, showing the inlet of the collector in greater detail.
Figure 11:
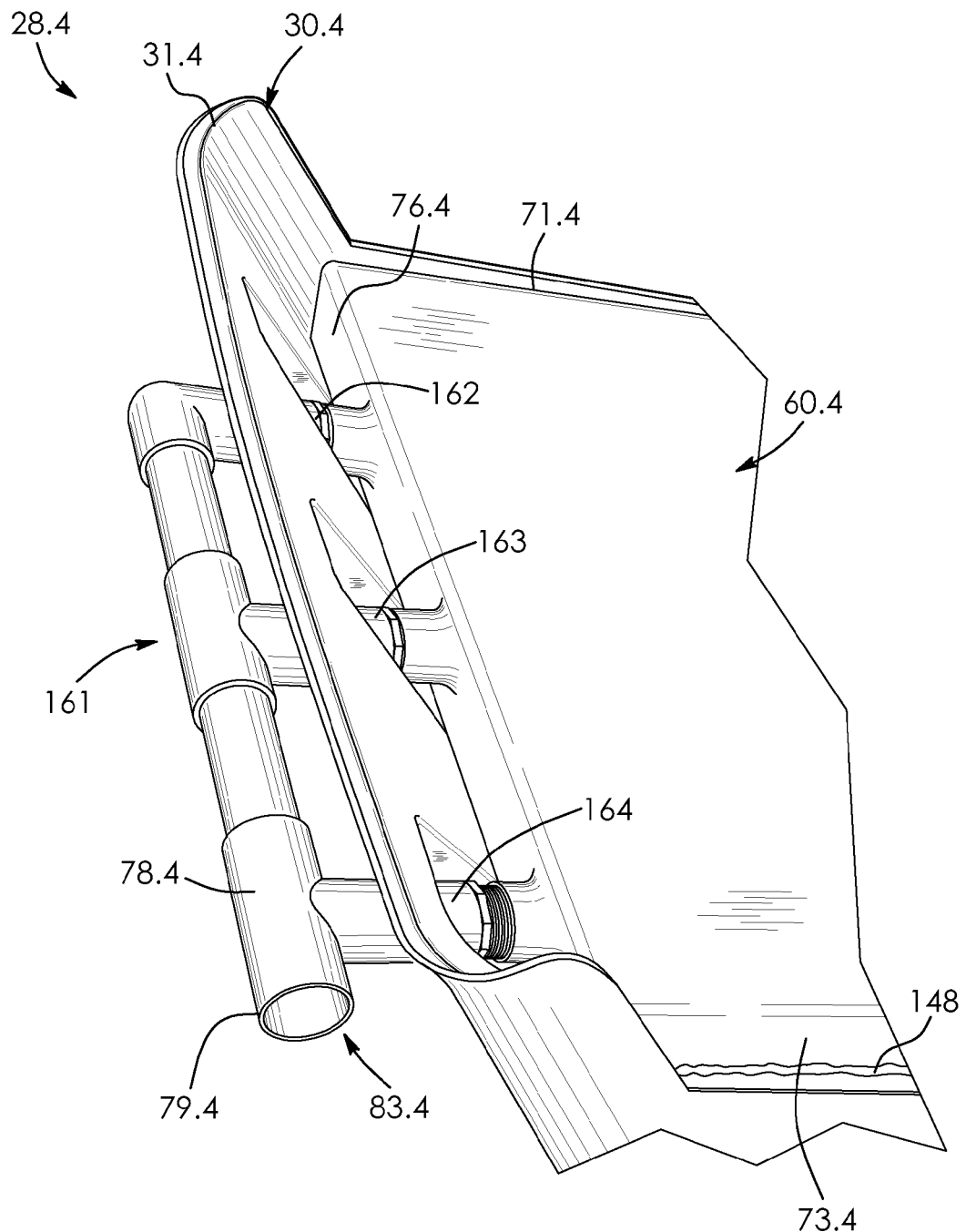
FIG. 11 is a bottom perspective view of part of the collector shown in FIG. 8 and part of the fender shown in FIG. 8, showing the outlet conduit of the collector in greater detail.

Sides 71.4 and 73.4 of the collector 60.4 are welded directly to the bottom 34.4 of the fender 30.4, as shown in FIG. 11 via side 73.4 and welding 148. Referring to FIG. 10, inner wall 77.4 of the collector 60.4 is not curved but rather consists of two flat portions 148 and 150 connected via bend 151. The collector has a straight, centrally disposed divider 152 interposed between the sides 71.4 and 73.4 of the collector. The central divider extends from portion 148 to wall 62.4 of the collector and enhances the rigidity of the collector 60.4. Wall 62.4 connects to the divider via welding as shown by weld 156. Inlet 72.4 of the collector has a pair of sections 158 and 160 positioned to receive air from the diverter 36.4. Sections 158 and 160 are formed by side 71.4, divider 152, side 73.4, portion 148 and wall 62.4.

Referring to FIG. 11, outlet conduit 78.4 is a part of a manifold 161. The manifold has a plurality of spaced-apart pipes 162, 163 and 164 extending from the base 76.4 of the collector 60.4. As best shown in FIG. 10, fender 30.4 has a plurality of apertures, as shown by aperture 165 for pipe 162, disposed adjacent to the fender's end 31.4. Pipes 162, 163, 164 extend through said respective apertures and connect to and are in communication with conduit 78.4, shown in FIG. 11, for diverting water collected therein towards outlet 83.4. The outlet 83.4 is disposed adjacent to side 73.4 of the collector 60.4 in this example and is configured to be axially and radially spaced-apart from the tires.

Figure 12:
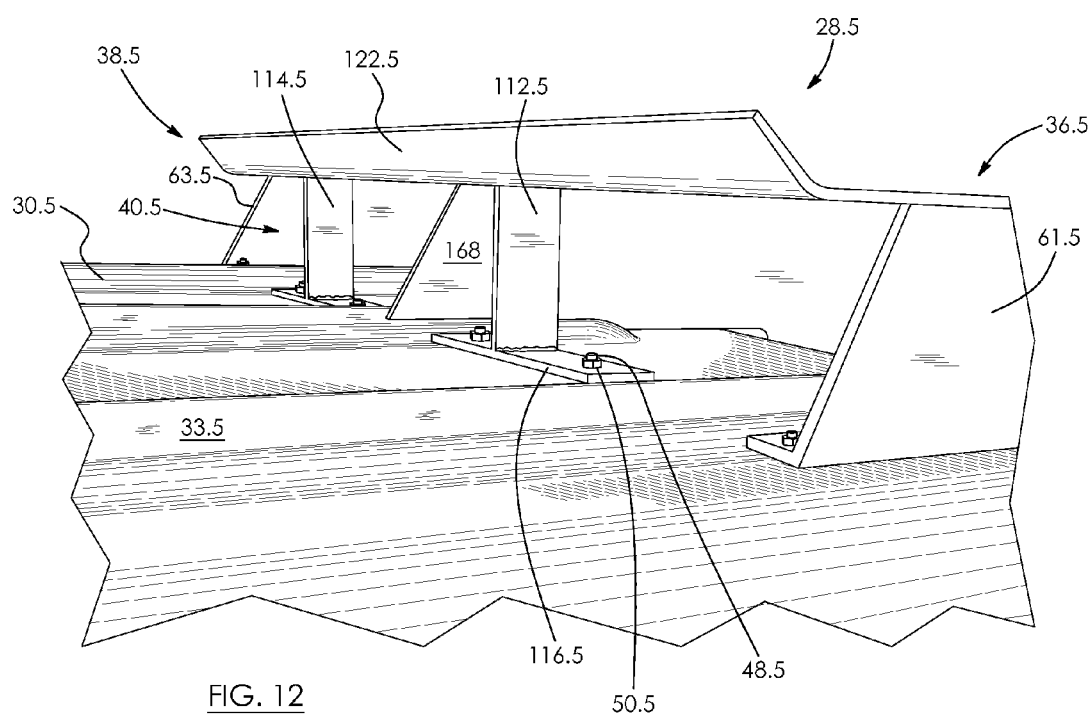
FIG. 12 is a top, front perspective view of part of a diverter shown in fragment of a tire spray assembly according to a sixth embodiment together with a fender shown in fragment, showing the inlet of the diverter.
Figure 13:
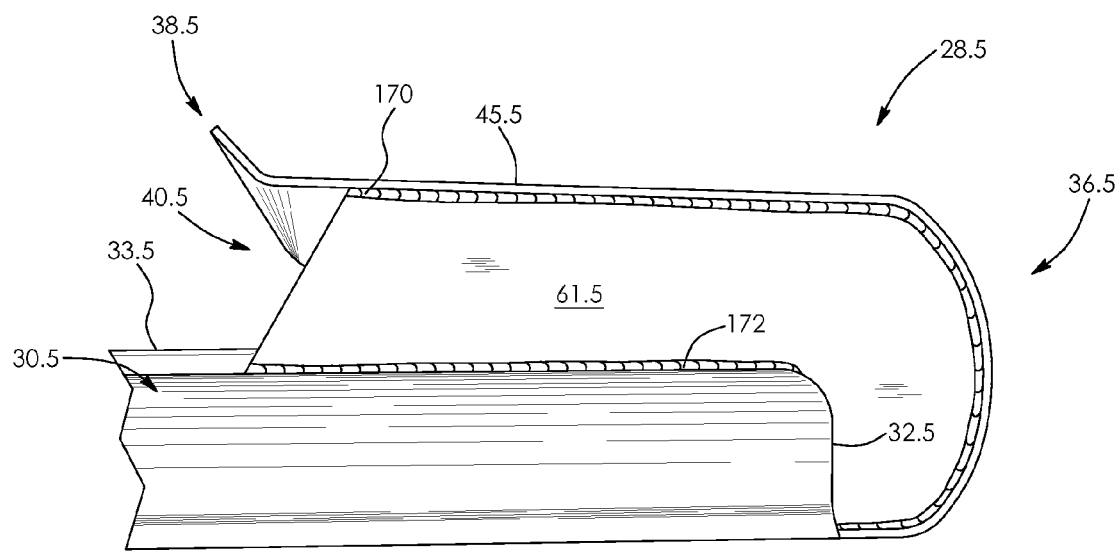
FIG. 13 is a side elevation view of the diverter shown in FIG. 12 connected to part of the fender, the fender being shown in fragment.

FIGS. 12 and 13 show a tire spray collecting assembly 28.5 according to a fifth embodiment. Like parts have like numbers and function as the embodiment shown in FIGS. 8 to 11 with decimal extension ".5" replacing ".4". Tire spray collecting assembly 28.5 is substantially the same as the tire spray collecting assembly 28.4 shown in FIGS. 8 to 11 with the following exceptions. Diverter 36.5 includes a central divider wall 168 interposed between and extending in parallel with sides 61.5 and 63.5 of the diverter. Wall 168 is configured to inhibit air cross-flows and promote the passage and diversion of air through the diverter in an efficient manner without unduly reducing the air's speed. Referring to FIG. 13, the sides of the diverter 36.5 as shown by side 61.5 connect to outer wall 45.5 via welding 170. The sides of the diverter as shown by side 61.5 also connect to the fender 30.5 via welding 172. Both the diverter and collector are made of $1/8^{th}$ inch aluminum in this example. However, the system may be made from a wide variety of materials, including plastic carbon-fibre composites.

It will be appreciated that many further variations and embodiments are possible within the scope of the invention described herein. The system as herein described may be sold as a kit. The system may be installed after or during manufacture of the trucks. The fender thus may be sold as part of the assembly. The assembly may be configured such that fender 30, diverter 36 and collector 60 are integral with each other and form a single part, as opposed to each being separate components connected together with bolts and nuts.

The assembly as herein described may be readily adapted to a three-axle wheel configuration for example.

It will be understood by someone skilled in the art that many of the details provided above are by way of example only and are not intended to limit the scope of the invention which is to be determined with reference to the following claims.

What is claimed is:

1. A tire spray collecting assembly connectable to a fender of a vehicle, the fender having a rear end and a bottom, the vehicle having a front end, and the assembly comprising:
   an air diverter connectable to the rear end of the fender for directing tire water spray towards the front end of the vehicle;
   a collector connectable to the bottom of the fender and being configured to capture said water spray so re-directed; and
   a pair of connectors, the diverter and the collector being connectable to the fender via the connectors.

2. The assembly as claimed in claim 1 wherein the collector is arcuate-shaped.

3. The assembly as claimed in claim 1 wherein the diverter is a duct.

4. A tire spray collecting assembly connectable to a fender of a vehicle, the fender having a rear end, a bottom and a top opposite the bottom, the vehicle having a front end, and the assembly comprising:
   an air diverter connectable to the rear end of the fender for directing tire water spray towards the front end of the vehicle, the diverter being connectable to the top of the fender and extendable around the rear end of the fender; and
   a collector connectable to the bottom of the fender and being configured to capture said water spray so re-directed.

5. The assembly as claimed in claim 4, wherein the diverter is u-shaped.

6. The assembly as claimed in claim 4, the fender having a front end opposite the rear end thereof, and wherein the collector is connectable to the front end of the fender.

7. The assembly as claimed in claim 4, wherein the diverter is a curved duct that is rectangular in cross-section.

8. The assembly as claimed in claim 4, wherein the collector is arcuate-shaped.

9. The assembly as claimed in claim 4, wherein the diverter is configured to promote passage of moving air in a smooth and continuous manner.

10. The assembly as claimed in claim 4, the assembly being installed after the vehicle is manufactured.

11. In combination, a fender and the assembly as claimed in claim 4.

12. The use of the assembly of claim 4 in a process of manufacturing of a vehicle.

13. The assembly as claimed in claim 4 wherein the diverter has an inlet positionable to face the front end of a vehicle.

14. The assembly as claimed in claim 4 wherein the diverter has an outlet positionable to face the collector.

15. The assembly as claimed in claim 4 wherein the diverter is a duct.

16. The assembly as claimed in claim 4, wherein the diverter further includes a plurality of internal dividers, the dividers channelling air so captured by the diverter in a streamline manner through the diverter.

17. The assembly as claimed in claim 4 wherein the diverter is connectable to the the rear end of the fender via welding.

18. The assembly as claimed in claim 4 wherein the collector is connectable to the the bottom of the fender via welding.

19. A tire spray collecting assembly connectable to a fender of a vehicle, the fender having a rear end and a bottom, the vehicle having a front end, and the assembly comprising:
   an air diverter connectable to the rear end of the fender for directing tire water spray towards the front end of the vehicle, the diverter having at least one internal divider configured to inhibit air cross-flows and streamline passage of moving air through the diverter; and
   a collector connectable to the bottom of the fender and being configured to capture said water spray so re-directed.

* * * * *